United States Patent
Cheng

(10) Patent No.: US 11,196,575 B2
(45) Date of Patent: Dec. 7, 2021

(54) ON-CHIPSET CERTIFICATION TO PREVENT SPY CHIP

(71) Applicant: INTERNATIONAL BUSINESS MACHINES CORPORATION, Armonk, NY (US)

(72) Inventor: Kangguo Cheng, Schenectady, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 152 days.

(21) Appl. No.: 16/393,419

(22) Filed: Apr. 24, 2019

(65) Prior Publication Data

US 2020/0344077 A1    Oct. 29, 2020

(51) Int. Cl.
  *H04L 9/32*    (2006.01)
  *G06F 21/75*   (2013.01)
  *G06F 21/76*   (2013.01)

(52) U.S. Cl.
  CPC .......... *H04L 9/3278* (2013.01); *G06F 21/75* (2013.01); *G06F 21/76* (2013.01)

(58) Field of Classification Search
  CPC ........ H04L 9/3278; G06F 21/75; G06F 21/76
  See application file for complete search history.

(56) References Cited

U.S. PATENT DOCUMENTS

| | | | |
|---|---|---|---|
| 7,401,223 B2 | 7/2008 | Walsley | |
| 7,698,572 B2 | 4/2010 | Janke | |
| 8,516,269 B1* | 8/2013 | Hamlet | G06F 21/445 713/189 |
| 8,797,139 B2 | 8/2014 | Lim | |
| 8,856,513 B2 | 10/2014 | Srinivasan et al. | |
| 9,589,154 B2 | 3/2017 | Srinivasan et al. | |
| 9,678,898 B2 | 6/2017 | Benedetti | |
| 9,860,235 B2 | 1/2018 | Curtis et al. | |
| 9,917,844 B2 | 3/2018 | Fossen et al. | |
| 10,107,855 B1* | 10/2018 | Corbett | G01R 31/2851 |
| 2009/0083833 A1* | 3/2009 | Ziola | H04L 9/3278 726/2 |
| 2009/0133119 A1 | 5/2009 | Kato et al. | |
| 2013/0019324 A1* | 1/2013 | Tehranipoor | G09C 1/00 726/34 |
| 2013/0108145 A1* | 5/2013 | Cobb | G06K 19/0718 382/141 |

(Continued)

OTHER PUBLICATIONS

Herder et al., "Physical Unclonable Functions and Applications: A Tutorial", Proceedings of the IEEE | vol. 102, No. 8, Aug. 2014, pp. 1126-1141.

*Primary Examiner* — Ellen Tran
(74) *Attorney, Agent, or Firm* — Tutunjian & Bitetto, P.C.; Randall Bluestone

(57) ABSTRACT

An apparatus is provided. The apparatus includes a set of chips designed to form an integrated chipset. Each of the chips has a Physically Unclonable Function (PUF) uniquely identifying each of the chips as part of the integrated chipset. The apparatus further includes a certification circuit, in signal communication with the chips, for certifying each of the chips as belonging to the integrated chipset and detecting any spy chips unbelonging to the integrated chipset, based on challenge-response results obtained using the PUF with respect to an expected chip count.

14 Claims, 7 Drawing Sheets

(56) References Cited

U.S. PATENT DOCUMENTS

| | | | |
|---|---|---|---|
| 2013/0125204 A1* | 5/2013 | La Fever | H04L 63/0435 726/2 |
| 2014/0108786 A1* | 4/2014 | Kreft | G06F 21/335 713/156 |
| 2014/0225639 A1* | 8/2014 | Guo | H04L 9/0866 326/8 |
| 2015/0106282 A1 | 4/2015 | Lee et al. | |
| 2015/0242620 A1* | 8/2015 | Newell | G06F 21/44 726/30 |
| 2015/0317480 A1* | 11/2015 | Gardner | H04L 9/32 726/2 |
| 2015/0370247 A1* | 12/2015 | Newell | G05B 19/41875 702/81 |
| 2016/0359635 A1* | 12/2016 | Kreft | H04L 9/3239 |
| 2017/0126415 A1* | 5/2017 | Deyati | H04L 9/3278 |
| 2017/0262860 A1* | 9/2017 | Teplinsky | G06Q 30/0185 |
| 2017/0344761 A1* | 11/2017 | Jennings | G09C 1/00 |
| 2018/0004944 A1* | 1/2018 | Nagata | H01L 21/822 |
| 2018/0307852 A1 | 10/2018 | Zhang | |

\* cited by examiner

ON-CHIPSET CERTIFICATION TO PREVENT SPY CHIP

BACKGROUND

The present invention generally relates to semiconductor devices, and more particularly to an on-chip certification to prevent a spy chip.

The security of the supply chain has become increasingly important. For example, a tiny spy chip can be placed in server chipsets that are used by companies and/or other entities. Since the spy chip is tiny, it is extremely difficult, if not impossible, to inspect every chipset to ensure the integrity of the chipset. Therefore, there is a need to ensure of the integrity of a chipset, even when a spy chip is maliciously placed on the chipset.

SUMMARY

According to an aspect of the present invention, an apparatus is provided. The apparatus includes a set of chips designed to form an integrated chipset. Each of the chips has a Physically Unclonable Function (PUF) uniquely identifying each of the chips as part of the integrated chipset. The apparatus further includes a certification circuit, in signal communication with the chips, for certifying each of the chips as belonging to the integrated chipset and detecting any spy chips unbelonging to the integrated chipset, based on challenge-response results obtained using the PUF with respect to an expected chip count.

According to another aspect of the present invention, a method for chipset certification is provided. The method includes assigning, to each of chips in a set of chips designed to form an integrated chipset, a Physically Unclonable Function (PUF) that uniquely identifies each of the chips as part of the integrated chipset. The method further includes certifying, by a certification circuit in signal communication with the chips, each of the chips as belonging to the integrated chipset and detecting, by the certification circuit, any spy chips unbelonging to the integrated chipset, based on challenge-response results obtained using the PUF with respect to an expected chip count.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

The present invention is directed to an on-chip certification to prevent a spy chip.

In an embodiment, the present invention provides a method and device that ensure the integrity of a chipset even when a spy chip is maliciously placed on the chipset during chip assembling.

In an embodiment, each chip on a given chipset obtains a unique identification. The unique identification can be, for example, a physically unclonable function (PUF). Of course, other unique identifiers could be used. In an embodiment, the PUF is a Static Random Access Memory-based PUF, a Ring-Oscillator-based PUF, and so forth.

In an embodiment, a spy chip is prevented from stealing information by performing a cross-certification process. The cross-certification process can be performed, for example, by the chipset owner or the customer who purchases the chipset. The cross-certification process can be performed in a number of ways. Various exemplary ways for performing the cross-certification process are described herein, although the present invention is not limited to the same.

For example, in an embodiment, when the chipset is powered on, a certification circuit, either on a dedicated chip or added to a normal chip during chip design, starts to certify each chip (e.g., CPU, GPU, memory, bus controller, etc.) by using a challenge-response mechanism of a PUF. The challenge-response pairs are generated and controlled by the legitimate chipset owner. Only certified chips are allowed to communicate. It is extremely unlikely for a spy chip to have PUF challenge-response pairs that can be legitimate to the chipset owner. Only certified chips are allowed to communicate with each other.

As another example, in an embodiment, the certification circuit has a counter, counting the number of chips that are certified on the chipset. In an unlikely even that the spy chip somehow sneaks through, the certification process will detect the exceeding of the number of legitimate chips as designed.

These and other cross-certification approaches can be used, while maintaining the spirit of the present invention.

Figure 1:
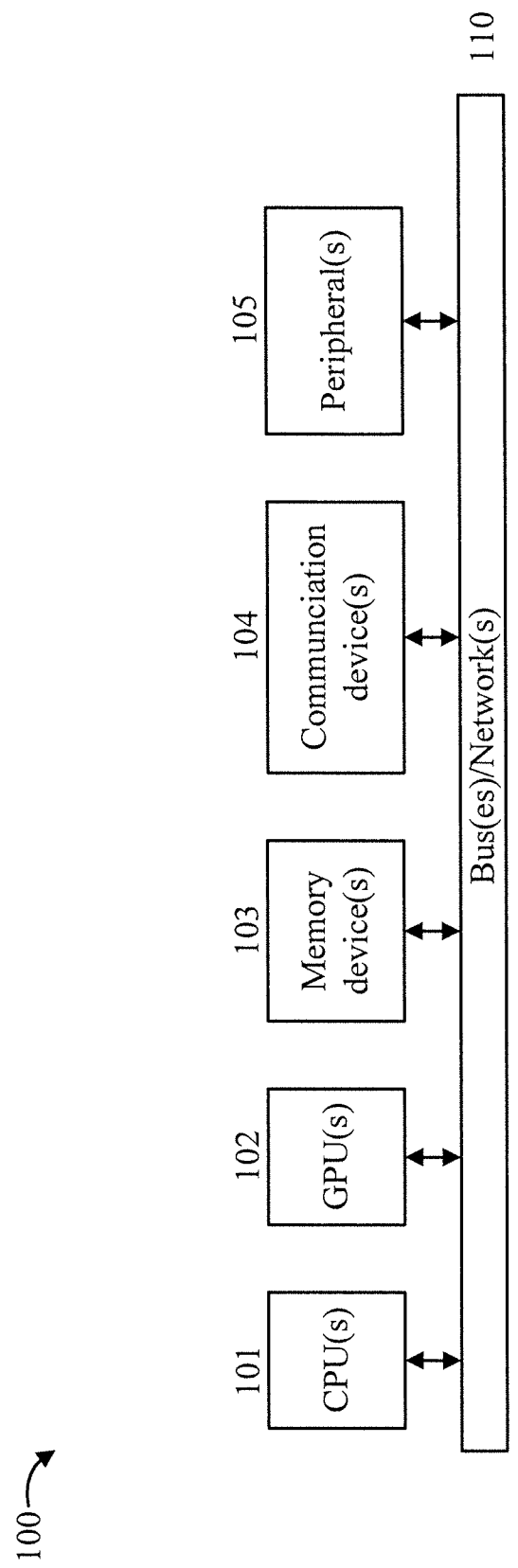
FIG. 1 is a block diagram showing an exemplary processing system to which the present invention may be applied, in accordance with an embodiment of the present invention.

FIG. 1 is a block diagram showing an exemplary processing system 100 to which the present invention may be applied, in accordance with an embodiment of the present invention.

It is to be appreciated that system 100 can include one or more elements in a chipset form, to which the present invention can be applied as described herein.

The processing system 100 includes a set of processing units (e.g., CPUs) 101, a set of GPUs 102, a set of memory devices 103, a set of communication devices 104, and set of peripherals 105. The CPUs 101 can be single or multi-core CPUs. The GPUs 102 can be single or multi-core GPUs. The one or more memory devices 103 can include caches, RAMs, ROMs, and other memories (flash, optical, magnetic, etc.). The communication devices 104 can include wireless and/or wired communication devices (e.g., network (e.g., WIFI, etc.) adapters, etc.). The peripherals 105 can include a display device, a user input device, a printer, an imaging device, and so forth. Elements of processing system 100 are connected by one or more buses or networks (collectively denoted by the figure reference numeral 110).

In an embodiment, memory devices 103 can store specially programmed software modules in order to transform the computer processing system into a special purpose computer configured to implement various aspects of the present invention. In an embodiment, special purpose hardware (e.g., Application Specific Integrated Circuits, and so forth) can be used to implement various aspects of the present invention. For example, either a dedicated or an integrated certification chip can be used in system 100, while maintaining the spirit of the present invention.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present invention provided herein.

Moreover, it is to be appreciated that various figures as described below with respect to various elements and steps relating to the present invention that may be implemented, in whole or in part, by one or more of the elements of system 100.

Various embodiments of the present invention involve a certification circuit for use in detecting unauthorized spy chips in chipsets by certifying the presence of only certified (authorized) chips in the chipsets. For the sake of illustration, an embodiment of the present invention will first be described in which the certification circuit is implemented in a stand-alone dedicated chip that is added as an additional chip to the given chipset (e.g., FIGS. 2 and 4-5). In another illustrative embodiment, the certification circuit is added to an existing chip in the given chipset such that the existing chip performs its usual functions as well as certification functions in accordance with the teachings of the present invention (e.g., FIGS. 3 and 6-7). These and other variations of the present invention are readily determined by one of ordinary skill in the art, given the teachings of the present invention provided herein, while maintaining the spirit of the present invention.

In an embodiment of the present invention, the certification circuit communicates with the chips in a given chipset using a secure protocol. For example, encrypted communications can be used between the chips of the chipset and the certification circuit. In an embodiment, the chipset can be normally disabled until activated by a certification process that is performed to verify that the chipset only includes authorized chips and is free of spy chips. Knowledge of a unique password (e.g., unique chip/chipset identifier) can be used to verify a chipset as being free of spy chips. In an embodiment, a Physically Unclonable Function (PUF) can be used. In an embodiment, a respective PUF can be used for each chip constituting a chipset. The PUF(s) can be a Static Random Access-based PUF, a Dynamic Random Access-Based PUF, a Radio Frequency (RF) PUF, a magnetic PUF, a Ring Oscillator-based PUF, an Oxide Rupture PUF, an optical PUF, a coating PUF, and so forth. The preceding are merely exemplary PUFs that can be used, noting that other PUFs, as well as other types of unique identifiers than PUFs, can be used to uniquely identify the chips belonging to a particular chipset, while maintaining the spirit of the present invention.

In an embodiment, the certification circuit can include a counter, a memory, a comparator, and an alert element. The counter is for counting the chips present in the chipset. The memory is for pre-storing the number of chips that are authorized and expected to be included in a given chipset. The comparator is for comparing the counter value to the stored value to detect whether any extra chips, likely to be spy chips, are present in the given chipset. The alert element can provide an alert or output signal indicating whether the given chipset is spy chip free or possible corrupted. In an embodiment, the alert element can be a Light Emitting Diode (LED).

PUFS can be used to implement various aspect of the present invention due to the uniqueness of the physical microstructures of each of the involved chips. This microstructure depends on random physical factors introduced during manufacturing. These factors are unpredictable and uncontrollable, which makes it virtually impossible to duplicate or clone the structure.

Rather than embodying a single cryptographic key, PUFs implement challenge-response authentication to evaluate this microstructure. When a physical stimulus is applied to the structure, it reacts in an unpredictable (but repeatable) way due to the complex interaction of the stimulus with the physical microstructure of the device. This exact microstructure depends on physical factors introduced during manufacture which are unpredictable. The applied stimulus is called the challenge, and the reaction of the PUF is called the response. A specific challenge and its corresponding response together form a challenge-response pair or CRP. A chip's identity is established by the properties of the microstructure itself. As this chip structure is not directly revealed by the challenge-response mechanism, such a device is resistant to spoofing and similar attacks. As used herein, the term "challenge-response results" refer to the responses that are implicated for given challenges in a challenge-response session for a given chipset. The responses can be used to certify that a chip that is part of the intended design of a chipset and can also be used to detect spy chips that are not part of the intended design of the given chip set.

Figure 2:
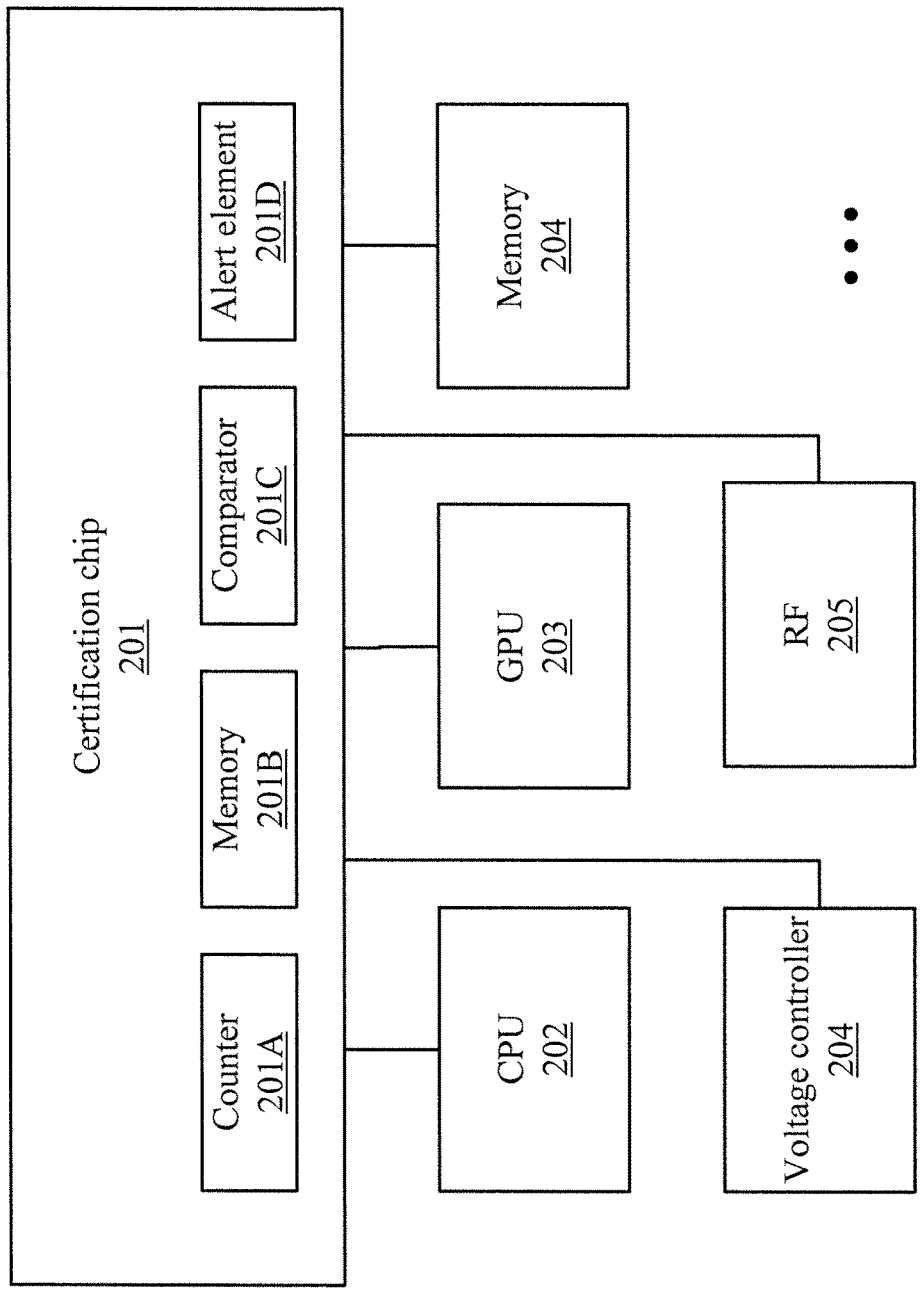
FIG. 2 is a block diagram showing an exemplary chipset with a dedicated certification chip, in accordance with an embodiment of the present invention.

FIG. 2 is a block diagram showing an exemplary chipset 200 with a dedicated certification chip 201, in accordance with an embodiment of the present invention.

The chipset 200 includes the dedicated certification chip 201, a CPU chip 202, a GPU chip 203, a memory chip 204, a voltage controller chip 205, and a Radio Frequency (RF) chip 206.

The dedicated certification chip 201 certifies the other chips before using the other chips. In the embodiment of FIG. 2, the dedicated certification chip 201 is a separate chip that is added to the other chips in the chipset 200.

The dedicated certification chip 201 includes a counter 201A, a memory 201B, a comparator 201C, and an alert element 201D for detecting spy chips based on a count value of the counter 201A exceeding (as determined by the comparator 201C) a count value stored in the memory 201B and providing an alert in response to the same.

Figure 3:
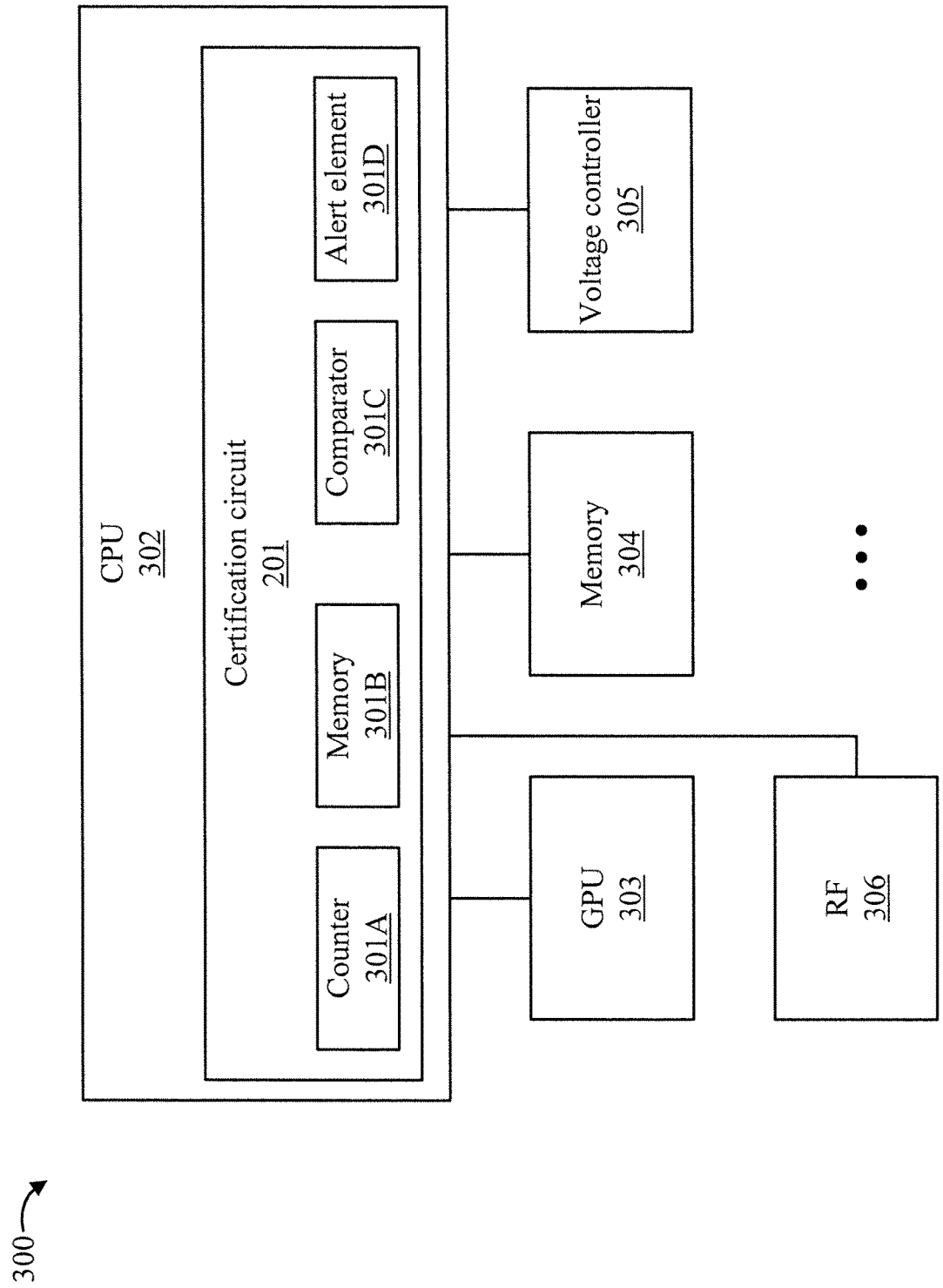
FIG. 3 is a block diagram showing an exemplary chipset with a certification circuit embedded in a chip of the chipset, in accordance with an embodiment of the present invention.

FIG. 3 is a block diagram showing an exemplary chipset 300 with a certification circuit 301 embedded in a chip of the chipset 300, in accordance with an embodiment of the present invention.

The chipset 300 includes a CPU chip 302, a GPU chip 303, a memory chip 304, a voltage controller chip 305, and a Radio Frequency (RF) chip 306. The CPU chip 302 includes the certification circuit 301.

The certification circuit 301 certifies the chips before using the chips. In the embodiment of FIG. 3, the dedicated certification chip 301 is a part of/integrated with the CPU chip 302. However, while shown as part of/integrated with the CPU chip, in other embodiments, the dedicated certification chip can be embedded in other ones of the chips (e.g., GPU, etc.), while maintaining the spirit of the present invention.

The certification circuit 301 includes a counter 301A, a memory 301B, a comparator 301C, and an alert element 301D for detecting spy chips based on a count value of the counter 301A exceeding (as determined by the comparator 301C) a count value stored in the memory 301B and providing an alert in response to the same.

Various methods will now be described, in accordance with various embodiments of the present invention. For example, a method will be described relative to FIGS. 4-5 relating to chipset 200 of FIG. 2. Thereafter, a method will be described relative to FIGS. 6-7 relating to chipset 300 of FIG. 3. While provided for the sake of illustration variations of these methods are readily determined by one of ordinary skill in the art, given the teachings of the present invention provided herein, while maintaining the spirit of the present invention.

Figure 4:
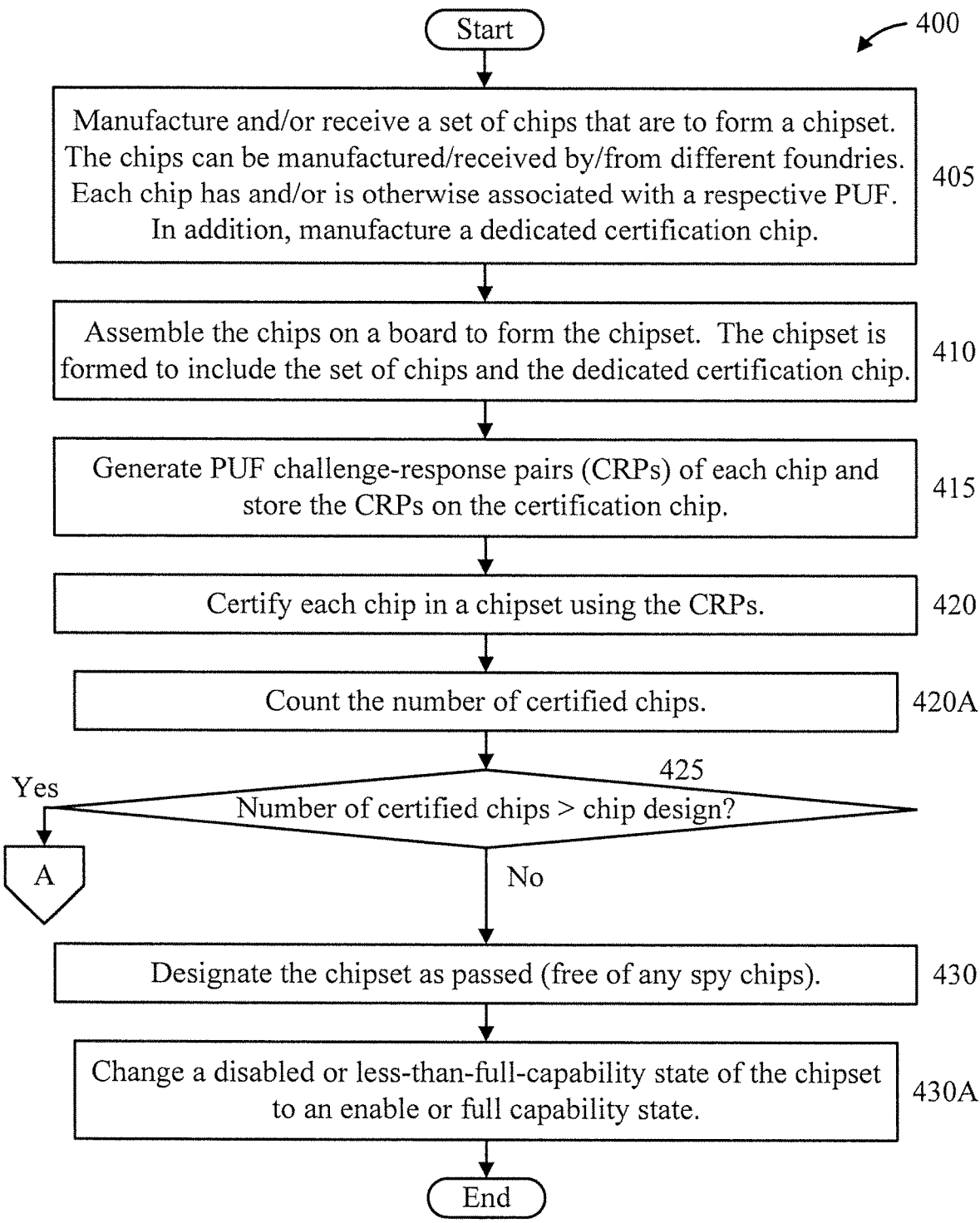
FIG. 4-5 are flow diagrams showing an exemplary method for enabling an on-chip certification to detect a spy chip, in accordance with an embodiment of the present invention.
Figure 5:
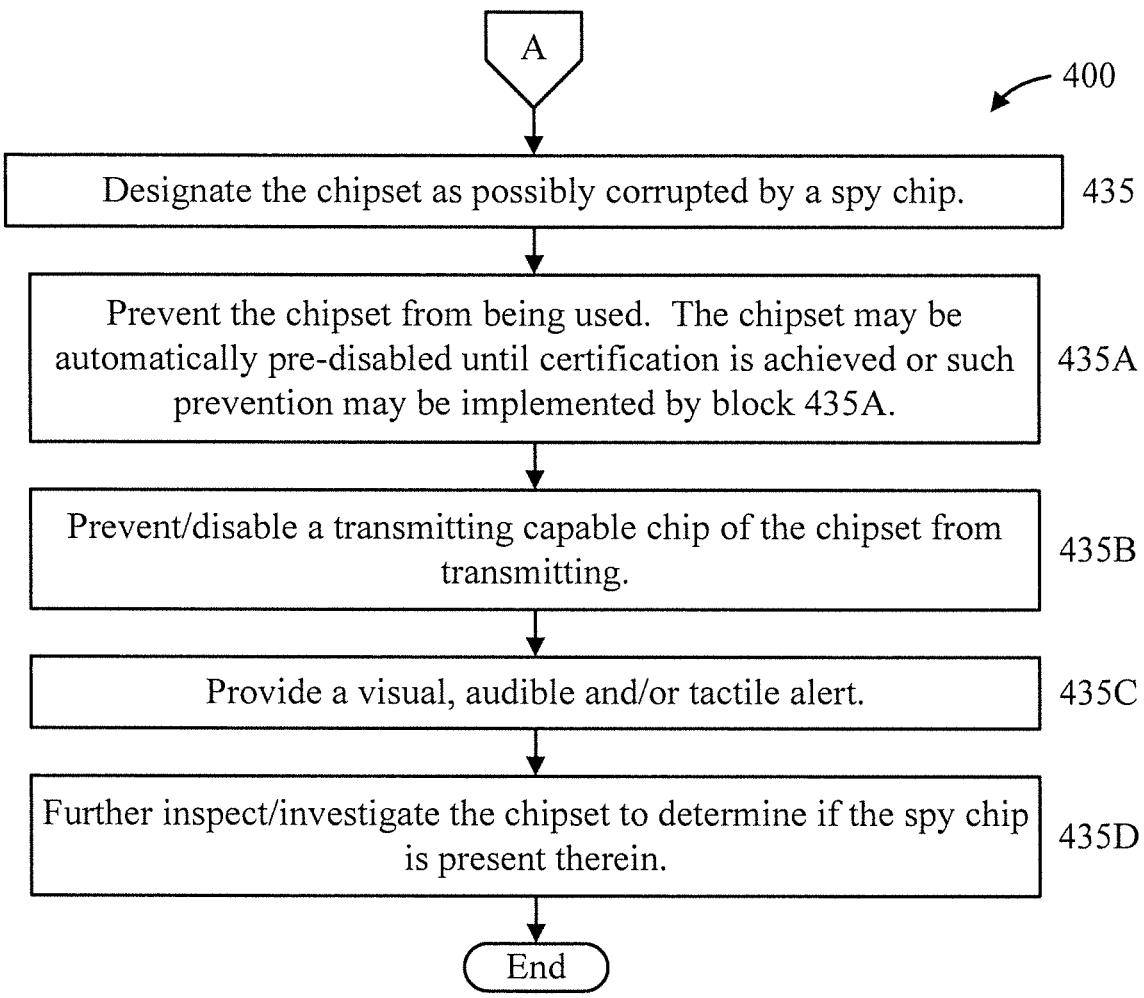

FIGS. 4-5 are flow diagrams showing an exemplary method 400 for enabling an on-chip certification to detect a spy chip, in accordance with an embodiment of the present invention. The embodiment of FIGS. 4-5 relate to an embodiment in which a dedicated certification chip is added to a given chipset to detect the presence of spy chips therein.

At block 405, manufacture and/or receive a set of chips that are to form a chipset. The chips can be manufactured/received by/from different foundries. Each chip has and/or is otherwise associated with a respective PUF. In addition, manufacture a dedicated certification chip.

At block 410, assemble the chips on a board to form the chipset. The chipset is formed to include the set of chips and the dedicated certification chip. It is to be appreciated that a spy chip may be maliciously introduced at this stage if the assembling is outsourced.

At block 415, generate PUF challenge-response pairs (CRPs) of each chip and store the CRPs on the certification chip. In an embodiment, block 415 is performed responsive to a receipt of the chipset by the owner or other entity.

At block 420, certify each chip in a chipset using the CRPs.

In an embodiment, block 420 can include block 420A.

At block 420A, count the number of certified chips.

At block 425, determine whether the number of certified chips exceeds the chip design. If so, then proceed to block 435. Otherwise, proceed to block 430.

At block 430, designate the chipset as passed, that is, free of any spy chips.

In an embodiment, block 430 includes block 430A.

At block 430A, change a disabled or less-than-full-capability state of the chipset to an enable or full capability state.

At block 435, designate the chipset as possibly corrupted by a spy chip.

In an embodiment, block 435 can include one or more of blocks 435A through 435CDB.

At block 435A, prevent the chipset from being used. In an embodiment, the chipset may be automatically pre-disabled until certification is achieved or such prevention may be implemented by block 435A.

At block 435B, prevent/disable a transmitting capable chip of the chipset from transmitting.

At block 435C, provide a visual, audible and/or tactile alert.

At block 435D, further inspect/investigate the chipset to determine if the spy chip is present therein.

Figure 6:
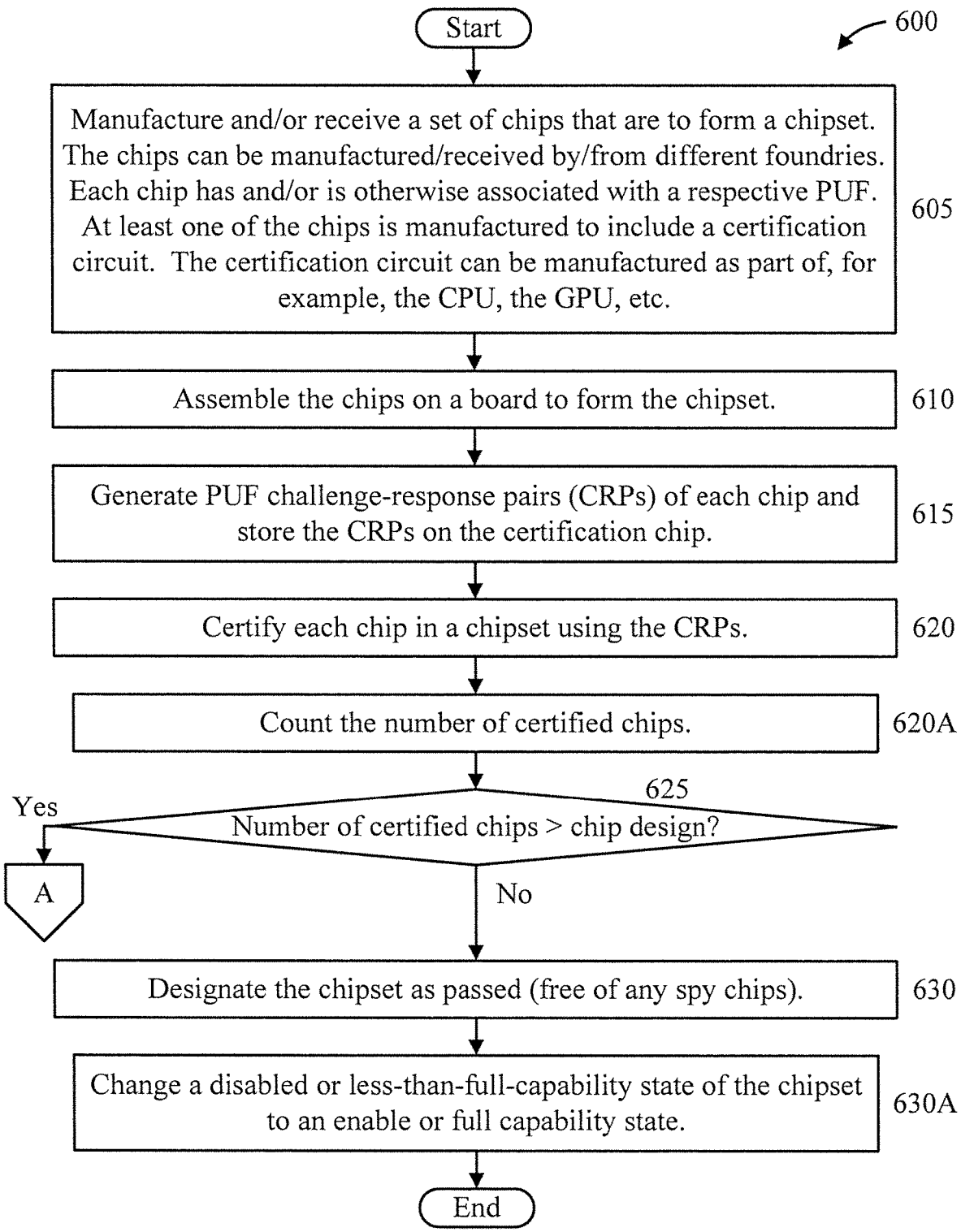
FIGS. 6-7 are flow diagrams showing another exemplary method for enabling an on-chip certification to detect a spy chip, in accordance with an embodiment of the present invention.
Figure 7:
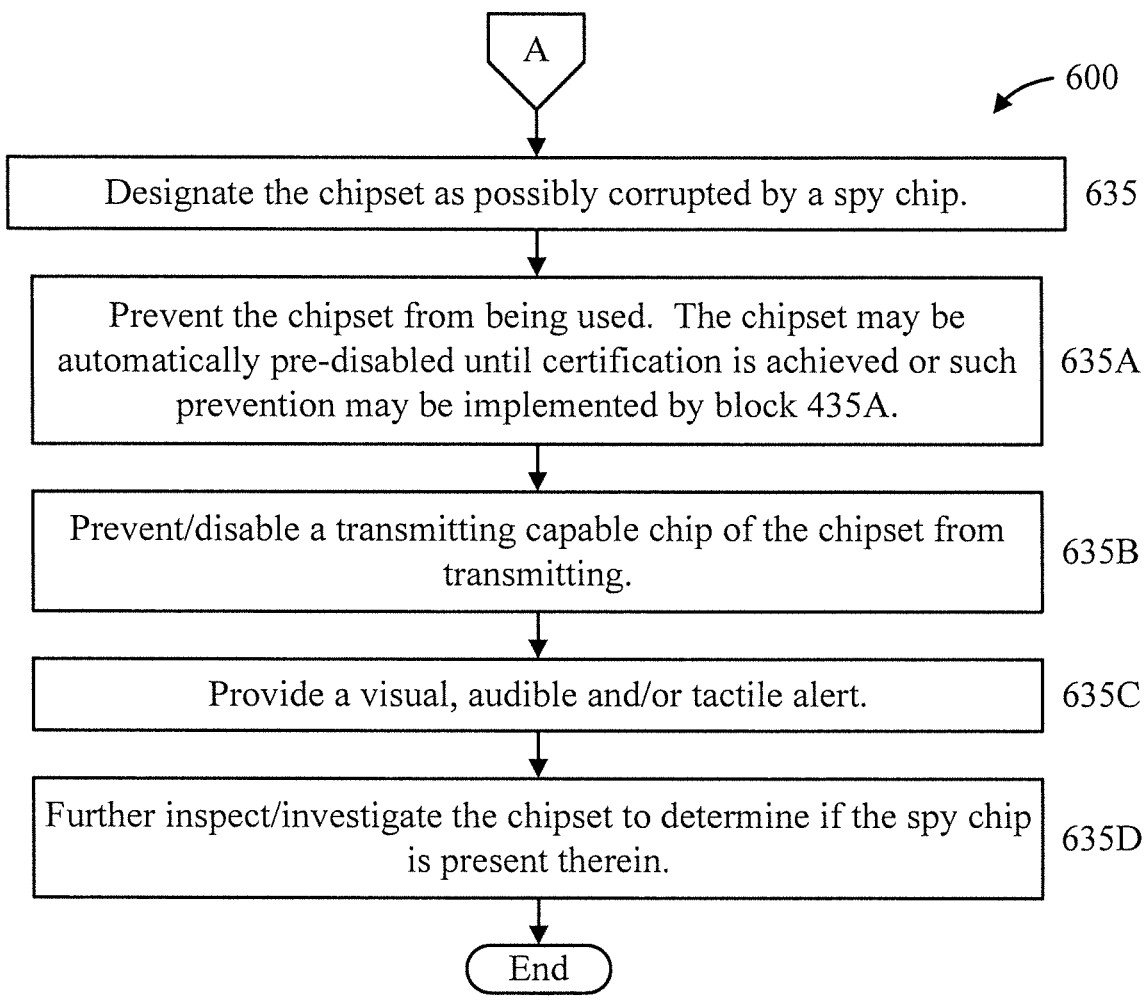

FIGS. 6-7 are flow diagrams showing an exemplary method 500 for enabling an on-chip certification to detect a spy chip, in accordance with an embodiment of the present invention. The embodiment of FIGS. 6-7 relate to an embodiment in which a dedicated certification chip is added to a given chipset to detect the presence of spy chips therein.

At block 505, manufacture and/or receive a set of chips that are to form a chipset. The chips can be manufactured/received by/from different foundries. Each chip has and/or is otherwise associated with a respective PUF. At least one of the chips is manufactured to include a certification circuit. The certification circuit can be manufactured as part of, for example, the CPU, the GPU, etc.

At block 510, assemble the chips on a board to form the chipset. It is to be appreciated that the spy chip may be maliciously introduced at this stage if the assembling is outsourced.

At block 515, generate PUF challenge-response pairs (CRPs) of each chip and store the CRPs on the certification chip. In an embodiment, block 515 is performed responsive to a receipt of the chipset by the owner or other entity.

At block 520, certify each chip in a chipset using the CRPs.

In an embodiment, block 520 can include block 520A.

At block 520A, count the number of certified chips.

At block 525, determine whether the number of certified chips exceeds the chip design. If so, then proceed to block 535. Otherwise, proceed to block 540.

At block 530, designate the chipset as passed, that is, free of any spy chips.

In an embodiment, block 530 includes block 530A.

At block 530A, change a disabled or less-than-full-capability state of the chipset to an enable or full capability state.

At block 535, designate the chipset as possibly corrupted by a spy chip.

In an embodiment, block 535 can include one or more of blocks 535A through 535C.

At block 535A, prevent the chipset from being used. In an embodiment, the chipset may be automatically pre-disabled until certification is achieved or such prevention may be implemented by block 535A.

At block 535B, prevent/disable a transmitting capable chip of the chipset from transmitting.

At block 535C, provide a visual, audible and/or tactile alert.

At block 535C, further inspect/investigate the chipset to determine if the spy chip is present therein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. An apparatus, comprising:
a set of chips designed to form an integrated chipset, each of the chips having a Physically Unclonable Function (PUF) uniquely identifying each of the chips as part of the integrated chipset; and
a certification circuit, in signal communication with the chips, for certifying each of the chips as belonging to the integrated chipset and detecting any spy chips unbelonging to the integrated chipset, based on challenge-response results obtained using the PUF with respect to an expected chip count,
wherein the certification circuit comprises a counter, and wherein the certification circuit detects the spy chips based on a chip count determined by the counter counting the chips in the set belonging to the integrated chipset.

2. The apparatus of claim 1, wherein the chipset is prevented from being used, responsive to a detection of any of the spy chips unbelonging to the integrated chipset.

3. The apparatus of claim 1, wherein the chipset is disabled, responsive to a detection of any of the spy chips unbelonging to the integrated chipset.

4. The apparatus of claim 1, wherein the chipset is partly disabled with respect to off-chip communications, responsive to a detection of any of the spy chips unbelonging to the integrated chipset.

5. The apparatus of claim 1, wherein the chipset is manufactured in a disabled state that is alterable to an enabled state, responsive to a determination that the chipset is free of the spy chips, the disabled state being limited to verification functions.

6. The apparatus of claim 1, wherein the certification circuit further comprises a memory for storing the expected chip count and a comparator for comparing the expected chip count stored in the memory to the chip count determined by the counter.

7. The apparatus of claim 1, further comprising an alert circuit for providing an alert that the chipset possibly includes one or more of the spy chips, responsive to the chip count determined by the counter exceeding the pre-determined chip count stored in the memory.

8. The apparatus of claim 1, wherein at least results portions of the challenge/result pairs are encrypted.

9. A method for chipset certification, comprising:
assigning, to each of chips in a set of chips designed to form an integrated chipset, a Physically Unclonable Function (PUF) that uniquely identifies each of the chips as part of the integrated chipset; and
certifying, by a certification circuit in signal communication with the chips, each of the chips as belonging to the integrated chipset and detecting, by the certification circuit, any spy chips unbelonging to the integrated chipset, based on challenge-response results obtained using the PUF with respect to an expected chip count,
wherein the certification circuit comprises a counter, and wherein the certification circuit detects the spy chips based on a chip count determined by the counter counting the chips in the set belonging to the integrated chipset.

10. The method of claim 9, wherein the chipset is prevented from being used, responsive to a detection of any of the spy chips unbelonging to the integrated chipset.

11. The method of claim 9, wherein the chipset is disabled, responsive to a detection of any of the spy chips unbelonging to the integrated chipset.

12. The method of claim 9, wherein the chipset is partly disabled with respect to off-chip communications, responsive to a detection of any of the spy chips unbelonging to the integrated chipset.

13. The method of claim 9, wherein the chipset is manufactured in a disabled state that is alterable to an enabled state, responsive to a determination that the chipset is free of the spy chips, the disabled state being limited to verification functions.

14. The method of claim 9, wherein the certification circuit further comprises a memory for storing the expected chip count and a comparator for comparing the expected chip count stored in the memory to the chip count determined by the counter.

* * * * *